(12) United States Patent
Terwart et al.

(10) Patent No.: US 11,333,239 B2
(45) Date of Patent: May 17, 2022

(54) METHOD FOR ACTUATING A HYDRAULIC SYSTEM OF A TRANSMISSION HAVING A VARIABLE DISPLACEMENT HYDRAULIC PUMP

(71) Applicant: ZF Friedrichshafen AG, Friedrichshafen (DE)

(72) Inventors: Markus Terwart, Thundorf (DE); Rainer Novak, Bregenz (AT); Frank Riever, Bad Brückenau (DE); Alexander Hoffmann, Lebach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 601 days.

(21) Appl. No.: 16/325,531

(22) PCT Filed: Jul. 10, 2017

(86) PCT No.: PCT/EP2017/067220
§ 371 (c)(1),
(2) Date: Feb. 14, 2019

(87) PCT Pub. No.: WO2018/033301
PCT Pub. Date: Feb. 22, 2018

(65) Prior Publication Data
US 2019/0195344 A1 Jun. 27, 2019

(30) Foreign Application Priority Data
Aug. 16, 2016 (DE) ...................... 10 2016 215 228.9

(51) Int. Cl.
*F16H 61/00* (2006.01)
*F16H 61/688* (2006.01)

(52) U.S. Cl.
CPC ....... *F16H 61/0025* (2013.01); *F16H 61/688* (2013.01); *F16H 2061/0053* (2013.01); *F16H 2342/10* (2013.01)

(58) Field of Classification Search
CPC .............. F16H 61/0025; F16H 61/688; F16H 61/0021; F16H 2061/0053; F16H 2342/10
See application file for complete search history.

(56) References Cited

U.S. PATENT DOCUMENTS

| 5,538,400 A | * | 7/1996 | Konishi | ................ F04C 14/226 417/220 |
| 6,155,948 A | | 12/2000 | Gierer | |

(Continued)

FOREIGN PATENT DOCUMENTS

| DE | 19643305 A1 | 4/1998 |
| DE | 102004008611 A1 | 9/2005 |

(Continued)

OTHER PUBLICATIONS

German Search Report DE102016215228.9, dated May 16, 2017. (12 pages).

(Continued)

*Primary Examiner* — Edwin A Young
(74) *Attorney, Agent, or Firm* — Dority & Manning, P.A.

(57) ABSTRACT

A method for actuating a hydraulic system of a transmission comprising a variable displacement hydraulic pump and a pilot-controllable system pressure valve, the method including, in order to determine a pump characteristic curve of the hydraulic pump, initially transferring the hydraulic system into a defined operating condition range in which the volumetric output flow, routed via the system pressure valve and applied at the system pressure valve by the hydraulic pump, is greater or less than a hydraulic fluid flow out of the hydraulic system. The method further includes pilot-controlling the system pressure valve to set a defined pressure (Continued)

level of the system pressure. The method additionally includes reducing or increasing the volumetric output flow while monitoring the system pressure, and determining a volumetric output flow corresponding to the hydraulic fluid flow of the hydraulic system with a certain deviation of a current system pressure from the defined system pressure.

17 Claims, 2 Drawing Sheets

(56) References Cited

U.S. PATENT DOCUMENTS

| | | | |
|---|---|---|---|
| 6,973,781 B2* | 12/2005 | Brown | F15B 1/024 |
| | | | 417/16 |
| 8,897,981 B2 | 11/2014 | Meissner et al. | |
| 9,545,901 B2* | 1/2017 | Kollmann | B60T 17/22 |
| 2010/0121548 A1* | 5/2010 | Muller | B60T 8/3655 |
| | | | 701/77 |
| 2010/0312441 A1 | 12/2010 | Long | |
| 2012/0039726 A1* | 2/2012 | Fritzer | F16H 61/0021 |
| | | | 417/53 |
| 2016/0116059 A1 | 4/2016 | Hohmann et al. | |
| 2017/0276087 A1* | 9/2017 | Behrendt | F02D 41/3845 |
| 2018/0017050 A1 | 1/2018 | Graf et al. | |

FOREIGN PATENT DOCUMENTS

| | | |
|---|---|---|
| DE | 102013210907 A1 | 12/2014 |
| DE | 102012021211 B4 | 4/2016 |
| DE | 102014222335 A1 | 5/2016 |
| DE | 102014226548 A1 | 6/2016 |
| WO | WO 2015/003960 A2 | 1/2015 |

OTHER PUBLICATIONS

International Search Report (English Translation) PCT/EP2017/067220, dated Nov. 7, 2017. (3 pages).

* cited by examiner

METHOD FOR ACTUATING A HYDRAULIC SYSTEM OF A TRANSMISSION HAVING A VARIABLE DISPLACEMENT HYDRAULIC PUMP

FIELD OF THE INVENTION

The invention relates generally to a method for actuating a hydraulic system of a transmission having a variable displacement hydraulic pump.

BACKGROUND

Automatic transmissions known from practical experience, such as dual clutch transmissions, usually include a hydraulic transmission control unit by which hydraulic fluid volumes are permanently made available, during operation, both for transmission actuation, i.e., an actuation of clutches, the shift actuators, and the like, and for cooling various components, such as a dual clutch system, tooth systems, bearings, and the like. The flow requirement arising at a particular time varies considerably during the operation of such a transmission, since the total hydraulic fluid flow to be made available, for example, for cooling a dual clutch system and an all-wheel clutch, as well as for actuating shift actuators, in addition to a current leakage of the hydraulic transmission control unit, fluctuates to a considerable extent depending on the operating condition.

In order to be able to operate the transmission to a desired extent, the hydraulic fluid flow made available by a hydraulic pump should always be greater than the current hydraulic fluid flow demand of a transmission. The current hydraulic fluid flow demand of a transmission is the minimum hydraulic fluid flow to be made available by the hydraulic pump depending on the operating condition, which is currently required for the transmission actuation. A resultant undersupply of further transmission-side demands, such as the cooling of the transmission, is at least temporarily tolerated during unfavorable operating condition characteristics of a transmission. In order to be able to set the particular demanded operating pressure or system pressure in the hydraulic system, the hydraulic systems of transmissions usually include a system pressure valve which is pilot-controllable to the desired extent with the aid of an electro-hydraulic pressure regulator.

The particular flow requirement demanded by the actuator system greatly depends on the current hydraulic and mechanical peripheral conditions. These peripheral conditions are decisively influenced by current driver demands and the particular resultant driving situations. The flow requirement varies to a considerable extent during a "racing start" driving operation or during a "stop-and-go" driving operation. As is known, transmissions such as dual clutch transmissions are involved to a proportionally greater extent over their entire service life in the implementation of vehicle operating states during which only low loads are to be transmitted and during which the flow requirement is low.

In the case of hydraulic pumps of transmissions, which are fixed displacement pumps and which are driven with the aid of the transmission input shaft or an output shaft of a drive machine of a vehicle drive train, the volumetric output flow made available by the hydraulic pump is proportional to the input speed. The hydraulic pumps are fixed displacement pumps configured with respect to their volumetric output flow such that the hydraulic pumps already provide the volumetric output flow sufficient for achieving the maximum performance at a comparably low pump speed.

This disadvantageously results in the situation, however, that a volumetric output flow which is considerably greater than the particular current demand is made available across a large operating range of a transmission with a hydraulic pump configured as a fixed displacement pump. The particular high volumetric output flow made available by a hydraulic pump causes comparatively high hydraulic power losses which adversely affect an energy-efficient operation of vehicles. In addition, the hydraulic system is also to be adapted, overall, to the particular volumetric output flows made available by a hydraulic pump configured as a fixed displacement pump by an appropriate structural outlay. Thus, for example, safety valves are to be provided in order to avoid impermissibly high operating pressures in the area of the hydraulic system in the event of high volumetric output flows of a hydraulic pump, and, moreover, appropriately large duct cross-sections are to be provided, which, in turn, increase an installation space requirement of the hydraulic system to an undesirable extent.

In order to be able to implement defined consumption targets of drive machines to the required extent, variable displacement hydraulic pumps are being utilized to an increasing extent, where the variable displacement hydraulic pumps are configured as variable displacement pumps, e.g., controlled by a closed-loop system, and include an appropriately intelligent, software-side control function, and where the displacement or volumetric output flow of the variable displacement pumps is variable between a minimum value and a maximum value. These types of hydraulic pumps are controlled, for example, with an electromagnetic pressure regulator and, due to the principles involved, have manufacturing tolerances in the overall assembly. The overall assembly having the hydraulic pump and the particular associated electromagnetic pressure regulator is characterized by a defined current/flow association, which is also referred to as a pump characteristic curve.

The pump characteristic curve on which the control is based must be known so that such a variable displacement pump is controllable with the required accuracy. Since pump characteristic curves vary to a considerable extent due to tolerances in the area of the electro-hydraulic pressure regulator and due to geometric and mechanical tolerances, the pump characteristic curves are to be determined separately for each hydraulic system on a special compensating test bench at the end of a production line. The specimen-specific data, which are then available, are stored in a so-called bin file and are flashed or uploaded into a control unit in the overall vehicle in a manner which is appropriate for the installed transmission. The so-called bin file data are made available to an electronic transmission control unit, wherein the quality of these bin file data is the essential basis for a reproducible and energy-efficient control of the transmission actuation and the transmission cooling.

It is problematic in this case, however, that, after the electronic transmission control unit or the hydraulics has/have been replaced, specimen-specific data of the pump characteristic curve, which were determined on the compensating test bench, or appropriate bin file data are no longer available. If only so-called default values or standard values are utilized for the further operation of a transmission or a dual clutch transmission whose electro-hydraulic transmission control system has been at least partially replaced, numerous problems occur during operation. The problems range from reduced comfort, as perceived by the driver, and so-called gear blockers, to burnt clutches or damage to bearings and gearwheels, which are caused by insufficient cooling and result in transmission failures and complaints.

It is not possible to re-determine the pump characteristic curve to an adequate extent during a visit to the workshop after a transmission has been repaired, since the sensor systems required for this purpose, i.e., flow rate sensors, system pressure sensors, and the like, are usually not available to repair shops, for cost reasons.

In addition, the operating behavior of a hydraulic pump changes over the service life of a transmission. In the event of deviations which are too high, the pump characteristic curve established at the beginning of the life cycle of a transmission must be adapted in order to avoid comfort-influencing responses, such as undesirable system pressure drops, high drag torques due to an unintentionally high volumetric output flow, and the like. This is not possible to the required extent with the aid of the adaptation routines presently stored in transmissions, however.

SUMMARY OF THE INVENTION

Therefore, the problem addressed by the present invention is that of providing a method for operating a hydraulic system of a transmission having a variable displacement hydraulic pump, by which specimen-specific data of a variable displacement hydraulic pump is determinable with little outlay, for example, after a replacement of one of the components of a hydraulic system, and is made available for a subsequent operation of a transmission.

In the method according to the invention for operating a hydraulic system of a transmission having a variable displacement hydraulic pump and having a pilot-controllable system pressure valve arranged on a pressure side of the hydraulic pump, by which a system pressure of a primary pressure circuit is adjustable depending on the volumetric output flow of the variable displacement hydraulic pump and on the pilot control, the hydraulic system is initially transferred into a defined operating condition range in order to determine a pump characteristic curve of the hydraulic pump. In the defined operating condition range, the volumetric output flow, which is routed via the system pressure valve and is applied at the system pressure valve by the hydraulic pump, is greater than or less than a hydraulic fluid flow which is flowing out of the hydraulic system and has been adjusted in a defined manner. The system pressure valve is appropriately pilot-controlled in order to set a defined pressure level of the system pressure, wherein the volumetric output flow is reduced or increased starting from this operating condition of the hydraulic system and the system pressure is monitored as this takes place. At the point in time at which a deviation of the particular current system pressure from the defined system pressure is greater than or equal to a first threshold or is less than or equal to a second threshold, a volumetric output flow of the hydraulic pump is determined, which corresponds to the hydraulic fluid flow of the hydraulic system.

The approach according to the invention is based on the fact that the volumetric output flow of the hydraulic pump during the operation of the transmission is divided into a cooling oil flow, a leakage flow, and a hydraulic fluid flow required for the transmission actuation, depending on the operating condition. The flow which is not required for the transmission actuation, and which also does not flow out of the hydraulic system due to a leakage of the hydraulic system, is available for cooling the transmission. When the transmission actuation has been deactivated, the hydraulic pump only needs to deliver the flow required to replace that which flows out due to the leakage of the hydraulic system in order to maintain the system pressure. In such an operating condition of the hydraulic system, the volumetric output flow of the hydraulic pump is equal to the sum of the leakage oil flows which are flowing out due to the leakages of the hydraulic system when a system pressure to be currently set has not quite been determined or has just stopped being determined.

In this case, during the determination of the volumetric output flow of the hydraulic pump according to the invention, starting from an operating condition of the hydraulic system in which the current system pressure corresponds to the currently set system pressure in the area of the system pressure valve, the volumetric output flow of the hydraulic pump is increased until a defined system pressure rise is detected when the first threshold has been reached or exceeded. Alternatively or in addition thereto, during the determination of the volumetric output flow of the hydraulic pump according to the invention, starting from an operating condition of the hydraulic system in which the volumetric output flow of the hydraulic pump is decreased until a deviation of the current system pressure from the currently set system pressure in the area of the system pressure valve is less than or equal to the second threshold.

Depending on the particular embodiment, it is possible that the first threshold and the second threshold deviate from one another or correspond to one another.

The approach according to the invention is a learning or training routine which is implementable into existing transmission systems with little outlay, and which is carried out in a simple and cost-effective way merely with the aid of the sensor system installed in the area of a transmission, in order to determine the current stationary dependence between the input parameter and the associated output parameter, i.e., the pump characteristic curve, with sufficient accuracy after a replacement of a transmission component, or to be able to adapt the pump characteristic curve to an operating behavior of the hydraulic pump changing over the service life. In this case, the input parameter is the actuating current of an electromagnetic pilot stage and the output parameter is the particular volumetric output flow of the variable displacement hydraulic pump resulting at the set actuating current of the electro-hydraulic pressure regulator when the hydraulic system has an appropriate structural configuration.

In an advantageous variant of the method according to the invention, the hydraulic system is transferred back into the defined operating condition range after determination of the volumetric output flow corresponding to the hydraulic fluid flow. Thereafter, the set hydraulic fluid flow of the hydraulic system is changed with respect to the preceding determination of the volumetric output flow of the hydraulic pump and, thereafter, the volumetric output flow of the hydraulic pump is reduced or increased again. At the point in time at which there is a deviation of the particular current system pressure from the defined system pressure equal to a threshold, a volumetric output flow of the hydraulic pump corresponding to the hydraulic fluid flow of the hydraulic system is re-determined, whereby further support points of the pump characteristic curve are gradually determined in a simple way.

If the hydraulic fluid flow of the hydraulic system is changed in steps, gradually, the pump characteristic curve is learned within short operating times on the basis of multiple support points which have been determined one after the other and are spaced apart from one another.

It is possible to change the hydraulic fluid flow of the hydraulic system with a defined pressure delta by a temporary charging of a clutch of the dual clutch system.

In order to be able to learn the pump characteristic curve to the desired extent and with little outlay, in one further advantageous variant of the method according to the invention, the volumetric output flow of the hydraulic pump is set at a defined level, in each case, in order to implement the defined operating condition of the hydraulic system.

If the defined level of the volumetric output flow of the hydraulic pump is set as a function of the hydraulic fluid flow in each case, it is ensured, in a simple way, that the particular volumetric output flow of the hydraulic pump predefined as the start value during the learning phase of the pump characteristic curve is adapted to the particular currently predefined hydraulic fluid flow and, thereafter, can be changed to an extent required for the determination of the volumetric output flow, until the defined system pressure drop is present.

In a variant of the method according to the invention, which is carried out with little effort, the hydraulic fluid flow is varied depending on an actuation of one or multiple electro-hydraulic pressure regulators of the hydraulic system.

In a variant of the method according to the invention which is particularly easy to carry out, the system pressure is determined by a measurement of a measuring unit arranged in the area of an actuator to which the system pressure is applied, wherein the pressure level of the actuating pressure to be applied in the area of the actuator is set to a value which is greater than the currently set system pressure.

If the actuating pressure to be applied in the area of a clutch of the transmission is set to a value greater than the system pressure with the aid of an electro-hydraulic pressure regulator associated with the clutch, the current system pressure, in turn, is determined with little outlay, in a manner which is favorable in terms of installation space and is cost-effective, with the aid of the sensor system which is already present in a transmission.

If the hydraulic fluid flow is determined with the aid of a model depicting the hydraulic system, the pump characteristic curve of the hydraulic pump is learned in a cost-effective way without additional sensors.

In a variant of the method according to the invention which is carried out with little actuation effort, the volumetric output flow of the hydraulic pump is varied depending on a pilot pressure which is predefined in the area of an electro-hydraulic pressure regulator, wherein the pilot pressure, in turn, depends on an actuating current which is applied at the pressure regulator.

In an alternative variant of the method according to the invention, a characteristic curve, which shows the dependence of the volumetric output flow of the hydraulic pump on the actuating current which is applied in the area of the electro-hydraulic pressure regulator associated with the hydraulic pump, is determined depending on the progression of the system pressure. The characteristic curve exactly depicts the real behavior of the hydraulic pump across at least a part of the entire operating range.

If the characteristic curve is created starting from defined support points, wherein the support points of the characteristic curve correspond to current values of the actuating current of the electro-hydraulic pressure regulator associated with the hydraulic pump, and a change of the gradient of the progression of the system pressure is determined at each of the support points, the determination of the characteristic curve is be carried out within short operating times.

If a default characteristic curve or standard characteristic curve, which depicts the dependence of the volumetric output flow of the hydraulic pump on the actuating current which is applied in the area of the electro-hydraulic pressure regulator associated with the hydraulic pump, is adapted as a function of the hydraulic fluid flow, the stationary relationship between the input value of the pilot control and the output value of the hydraulic pump is determined within short operating times with the aid of the method according to the invention.

In a further advantageous variant of the method according to the invention having little outlay, the standard characteristic curve or the default characteristic curve is adapted starting from defined support points of the standard characteristic curve, wherein the support points of the standard characteristic curve correspond to current values of the actuating current of the electro-hydraulic pressure regulator associated with the hydraulic pump.

If the defined support points of the characteristic curve or of the default characteristic curve are determined by a ramp-like raising and a subsequent ramp-like reduction of the actuating current of the electro-hydraulic pressure regulator associated with the hydraulic pump, wherein the particular current value corresponding to a support point is the mean value of the current values determined for one support point in each case during the ramp-like raising and the ramp-like reduction of the actuating current, hysteresis effects occurring in relation to the values to be learned are resolved with little outlay.

In order to minimize the risk of an erroneous detection and establish whether the determined or learned values are correct, in an advantageous variant of the method according to the invention, the particular current values determined for the support points are validated with the aid of predefined values. Therefore, an appropriate indication is available, in each case, as to whether a new learning attempt is to be carried out or whether the hydraulics of the transmission are to be replaced.

BRIEF DESCRIPTION OF THE DRAWINGS

Further advantages and advantageous embodiments of the subject matter of the invention result from the claims and the exemplary embodiment, the principle of which is described in the following with reference to the drawing.

In the drawings, the following is shown.

DETAILED DESCRIPTION

Figure 1:
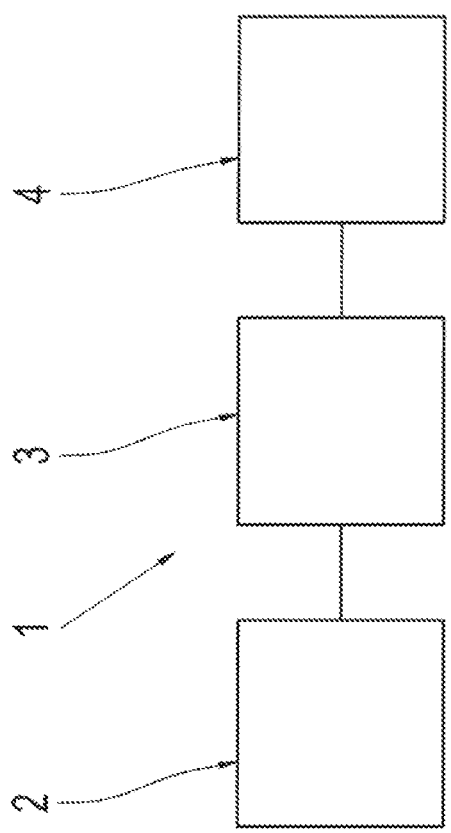
FIG. 1 shows a highly schematic view of a vehicle drive train having a drive machine, a driven end, and a transmission arranged between the drive machine and the driven end in the power path of the vehicle drive train.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic representation of a vehicle drive train 1 having a drive machine 2, a transmission 3 designed as a dual clutch transmission, and a driven end 4, wherein the transmission 3 is operatively connected on the input side to the drive machine 2 and on the output side to the driven end 4. The transmission 3 includes an electro-hydraulic transmission control system or a hydraulic system which has a pressure medium source, embodied in this case as an actively variable and controllable hydraulic pump, which is, e.g., actively variable-displacement and controllable by way of a closed-loop system. In this case, the variable displacement hydraulic pump is a variable and controllable vane pump, by which a variable displacement or a variable volumetric output flow is made available, wherein other suitable models or types of variable displacement pumps, which are, e.g., controllable by way of a closed-loop system, are usable. The displacement of the hydraulic pump is actively adjustable by a valve unit or an electro-hydraulic pressure regulator which is also referred to as an electromagnetic pressure regulator.

In addition to the valve unit, the electro-hydraulic transmission control system also includes a so-called system pressure valve, in the area of which a system pressure is adjustable in a pressure circuit of the electro-hydraulic transmission control system, where the pressure circuit is a primary pressure circuit. The primary pressure circuit is supplied with hydraulic fluid, which is made available by the hydraulic pump, by the system pressure valve with higher priority than a secondary pressure circuit which is also arranged downstream from the system pressure valve. Various consumers of the transmission 3 are supplied with hydraulic fluid both via the primary pressure circuit and via the secondary pressure circuit, wherein actuating pressure is applied via the primary pressure circuit, inter alia, to shift elements of a dual clutch system of the transmission 3, while a cooling and lube oil system of the transmission 3 is supplied via the secondary pressure circuit of the electro-hydraulic transmission control system.

In this case, the hydraulic pump is driven directly by the drive machine 2 via an input shaft of the transmission 3, whereby the input speed of the hydraulic pump is essentially equal to the rotational speed of the drive machine 2. Depending on the particular application at hand, it is also possible that a transmission having a defined ratio is provided between the transmission input shaft and the hydraulic pump, via which the rotational speed of the drive machine 2 is transformed to a higher rotational speed level or a lower rotational speed level.

A pilot-controllable cooling valve of the secondary pressure circuit is provided downstream from the system pressure valve, via which the system pressure valve is brought into an operative connection with areas of the transmission 3 in order to supply these areas with hydraulic fluid. The areas of the transmission 3 have different hydraulic resistances. Distribution factors of the hydraulic fluid present in the area of the cooling valve of the system pressure valve in the direction of the areas of the transmission 3 vary, at least in some areas, across the operating range of the cooling valve.

In order to be able to control the hydraulic pump with the required accuracy, the stationary dependence of an actuating current of the electro-hydraulic pressure regulator associated with the hydraulic pump and of the particular volumetric output flow of the hydraulic pump corresponding thereto is determined before the transmission 3 is delivered to a special component test bench or compensating test bench. Therefore, specimen-specific tolerances in the area of the pilot stage or the electro-hydraulic pressure regulator as well as geometric and mechanical tolerances of the hydraulic pump and of the hydraulic system are representable. The data determined on the component test bench are stored in a so-called bin file and are flashed or uploaded into a control unit in the overall vehicle in a manner which is appropriate for the installed transmission 3.

Figure 2:
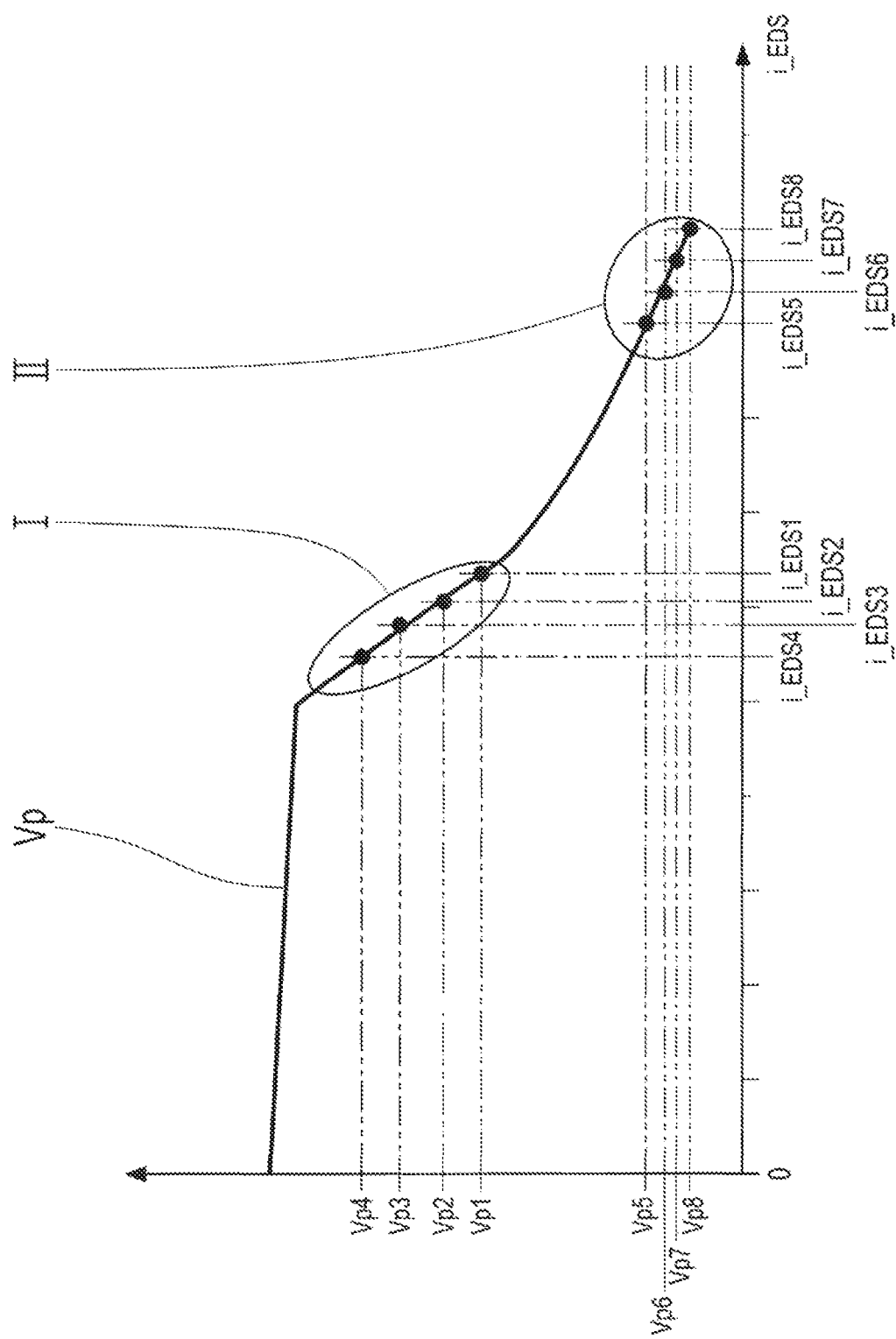
FIG. 2 shows a curve of a volumetric output flow of a variable displacement hydraulic pump with respect to an actuating current of an electro-hydraulic pressure regulator associated with the hydraulic pump.

In order to ensure that the transmission can continue to be operable to the desired extent after a replacement of the electronic transmission control unit or the hydraulics of the hydraulic system or the electro-hydraulic transmission control system, or in order to be able to take an operating behavior of the hydraulic pump into account, which changes over the service life, the stationary relationship between the actuating current i_EDS of the electro-hydraulic pressure regulator and the volumetric output flow Vp of the hydraulic pump, which is represented in FIG. 2, is determinable to the desired extent, in a simple way, with the aid of the approach described in greater detail in the following, for the new transmission which is present after the repair or after the replacement of one of the components of the hydraulic system, or for the transmission which is already present.

For this purpose, the system pressure valve, which, in this case, is acted upon with pilot pressure via an electro-hydraulic pressure regulator to the same extent as the cooling valve, is initially transferred into an operating condition via an appropriate application of a pilot pressure, in which the minimum system pressure is set in the area of the system pressure valve. In addition, the supply flow Vp of the pressure medium source, i.e., the hydraulic pump, is set to a value at which flow forces act on the system pressure valve or on its valve slide and bring about a flow-proportional increase of the minimum system pressure. The minimum system pressure to be adjusted is considerably exceeded, since, as a result, a higher pressure drop also sets in at the hydraulic resistances downstream from the system pressure valve slide. In this operating condition, the system pressure valve is located at the end stop and has the operating condition of an orifice.

The hydraulic fluid flow routed via the system pressure valve is equal to the product of an orifice constant of the flow cross-section of a line range extending between the system pressure valve and up to the oil sump, the orifice constant being utilized for taking the structural features into account, and the square root of the pressure differential between the pressure upstream from the system pressure valve and the pressure downstream from the system pressure valve. In order to achieve this behavior of the system pressure valve, the system pressure valve is to be pilot-controlled, as mentioned above, in such a way that the minimum system pressure is adjusted in the area of the system pressure valve and, simultaneously, the hydraulic fluid flow applied by the hydraulic pump at the system pressure valve, and the volumetric output flow Vp and the pump drive speed corresponding thereto, are therefore to be set high enough that the system pressure valve is located at the end stop.

Moreover, the supply of further hydraulic consumers of the transmission 3, such as separating clutches, actuators, and the like, is to be switched off, and so the volumetric output flow of the hydraulic pump, which has been reduced by the system leakage, continuously flows through the secondary circuit or the cooling oil path of the system pressure valve in the direction of the cooling valve which is held in a defined operating condition, in which the hydraulic resistance downstream from the system pressure valve is essentially constant. Starting from this operating condition of the hydraulic system, an appropriately high volumetric output flow of the hydraulic pump results in a defined increase of the minimum system pressure which is implementable. Due to the small spread of the hydraulic resistances under constant conditions, for example, at a constant operating temperature, a defined volumetric output flow brings about an expected pressure in the secondary pressure circuit.

In order to learn or determine the pump characteristic curve of the hydraulic pump, a current ramp of the actuating current i_EDS is followed. The actuating current i_EDS is applied to the electro-hydraulic pressure regulator associated with the hydraulic pump. The system pressure is monitored while the current ramp is followed.

In this case, the system pressure is indirectly measured with the aid of pressure sensors in the area of the clutches of the dual clutch system of the transmission 3. For this purpose, a clutch valve of one of the clutches of the dual clutch system, whose associated sub-transmission of the transmission 3 is disengaged or in whose area a gear is not engaged, is transferred into a condition in which the actuating pressure to be applied in the area of the clutch is always higher than the currently set system pressure. Since only the system pressure is applied in the area of the clutch or in the area of the pressure sensor of the clutch, the system pressure is determined, with little outlay, with the aid of the pressure sensor of the clutch.

The pump characteristic curve is learned on the basis of multiple defined support points, wherein a support point is defined, in each case, by a flow value Vp1 to Vp4 and a value i_EDS 1 to i_EDS4 of the actuating current i_EDS of the electro-hydraulic pressure regulator associated with the hydraulic pump.

Since each flow value or volumetric output flow value Vp1 to Vp4 corresponds to a defined system pressure value under the conditions described above in greater detail, a support point of the pump characteristic curve can be learned by way of the fact that, while the current ramp is followed, the current value of the actuating current i_EDS of the electro-hydraulic pressure regulator associated with the hydraulic pump is stored, in each case, when a pressure value of the system pressure corresponding to a defined flow value Vp1 to Vp4 is reached.

In order to be able to resolve hysteresis effects occurring during the determination of the values to be learned, i.e., the support points, the current ramp of the actuating current i_EDS of the electro-hydraulic pressure regulator associated with the hydraulic pump is followed in both directions and the mean value of the current values determined for a particular support point are formed for each support point. This means, the actuating current i_EDS is initially raised in a ramp-like manner from a defined lower value up to a defined upper value and the system pressure is monitored as this takes place. Thereafter, the actuating current i_EDS of the electro-hydraulic pressure regulator is reduced in a ramp-like manner from the upper current value to the lower current value and the system pressure is likewise monitored as this takes place.

During a plausibility check carried out after a determination of the working points, i.e., the support points, of the pump characteristic curve, it is decided whether the determined values are plausible or correct, or whether there is a risk of an erroneous detection. Depending on the query result, an appropriate indication is determined regarding whether a new learning attempt will be started, or whether the hydraulics are to be replaced.

The above-described approach is suitable for learning or determining a range I of the pump characteristic curve characterized in greater detail in FIG. 2, wherein the range encompasses higher volumetric output flows Vp1 to Vp4 of the variable displacement hydraulic pump 3. This results from the fact that the flow Vp during the above-described approach for learning the pump characteristic curve is to be set sufficiently high to generate the above-described effect to an evaluable extent.

Moreover, this approach is suitable for learning, in a specimen-specific manner, the pump characteristic curve at higher volumetric output flows Vp1 to Vp4 of the variable displacement hydraulic pump in the case of after-sales service, for example, after a replacement of the hydraulic control unit or the electric transmission control unit. In addition, with the aid of the above-described approach, it is also possible to adjust and appropriately adapt the pump characteristic curve to the service life effects, in the form of an adaptation routine, during operation of a vehicle in suitable driving situations, such as constant travel.

The further approach described in greater detail in the following is provided for the purpose of learning a range II of the pump characteristic curve characterized in greater detail in FIG. 2, i.e., for smaller volumetric output flows Vp5 to Vp8 of the hydraulic pump.

The further approach is based on the fact that the volumetric output flow Vp of the hydraulic pump during the operation of the transmission 3 is divided into a cooling oil flow, a leakage flow, and a hydraulic fluid flow required for the transmission actuation, depending on the operating condition. The flow which is not required for the transmission actuation, and which also does not flow out of the hydraulic system due to the leakage of the hydraulic system, is available for cooling the transmission 3. When the transmission actuation has been deactivated, the hydraulic pump only needs to deliver the flow required to replace that which flows out due to the leakage of the hydraulic system in order to maintain the system pressure. In such an operating condition of the hydraulic system, the volumetric output flow Vp of the hydraulic pump is equal to the sum of the leakage oil flows flowing out due to the leakages of the hydraulic system when a defined system pressure drop is determined.

The leakage oil flows flowing out due to the leakages of the hydraulic system are determinable in a simple way with the aid of a simulation and are adjusted and influenced to a defined extent by actuating electro-hydraulic pressure regulators of the hydraulic system in a targeted manner. Therefore, in turn, multiple flow support points are defined, which are determined in a simple way.

In order to determine the range II of the pump characteristic curve of the hydraulic pump, the total leakage oil flow flowing out of the hydraulic system is set, in an appropriately selected manner, by a defined actuation of the electro-hydraulic pressure regulator which is not involved in the, e.g., closed-loop, control of the hydraulic pump and of the system pressure. In addition, the system pressure is set to a defined pressure value. Thereafter, a current ramp of the electro-hydraulic pressure regulator associated with the hydraulic pump is followed and, as a result, the volumetric output flow Vp made available by the hydraulic pump is reduced from an upper volumetric output flow value in the direction of a lower volumetric output flow value and, additionally, the system pressure is monitored, by measurement, to the above-described extent in the area of the pressure sensor of one of the clutches of the dual clutch system of the transmission 3.

As soon as a defined system pressure drop starting from the defined pressure value of the system pressure has been determined, a volumetric output flow Vp5 of the hydraulic pump is detected, which is equal to the sum of the leakage oil flows of the hydraulic system, which were previously set in a defined manner. In this case, the defined pressure value of the system pressure has a pressure level, starting from which a detectable system pressure drop is caused by the current ramp being followed. Simultaneously, the present actuating current value i_EDS5 of the electro-hydraulic pressure regulator associated with the hydraulic pump is assigned to the determined volumetric output flow value and is stored as a support point of the pump characteristic curve.

In order to compensate for hysteresis effects, the current ramp is also followed in the opposite direction, wherein the defined pressure value of the system pressure is also initially required for this purpose. However, since the starting point is an actuating current value i_EDS at which the volumetric output flow made available by the hydraulic pump is insufficient for reaching the required system pressure value, an undersupply of the hydraulic system or a system pressure drop is initially detected. Thereafter, the actuating current of the electro-hydraulic pressure regulator associated with the hydraulic pump is successively changed in such a way that the volumetric output flow of the hydraulic pump increases and the system pressure drop is increasingly reduced. At the point in time at which a system pressure drop is first no longer detected, a volumetric output flow Vp5 of the hydraulic pump is determined, which corresponds to the currently set system leakages.

Thereafter, the mean values of the flow and the valve energization for the determined flow Vp5 and the actuating current i_EDS5 correlating therewith, respectively, are calculated and stored.

In addition, support points of the range II of the pump characteristic curve characterized by the volumetric output flows Vp6 to Vp8 and the actuating currents i_EDS6 to i_EDS8 correlating therewith are also determined with the further approach, by way of the fact that electro-hydraulic pressure regulators of the hydraulic system are appropriately energized in order to vary the leakage oil flow flowing out of the hydraulic system and, for example, to allow the leakage oil flow to significantly increase. In this case, an undesirable influencing of hydraulic consumers associated with the electro-hydraulic pressure regulators to be energized is avoided, however. For example, an energization of an electro-hydraulic pressure regulator associated with a clutch is carried out only up to an upper limit, below which a charging of the clutch or an effect on the power transmission capacity of the clutch does not take place.

It is at the discretion of a person skilled in the art, of course, depending on the particular application at hand, to determine more or fewer than four support points for learning the pump characteristic curve.

Since leakage oil flows of hydraulic systems of transmissions tend to be small, due to the principles involved, only support points of the pump characteristic curve for smaller flows Vp5 to Vp8 of the hydraulic pump are learned with the aid of the further approach.

With the aid of a plausibility check carried out after the determination of the support points, it is possible, in turn, to decide whether the values determined for the pump characteristic curve are plausible or whether there is a risk of an erroneous detection.

Depending on the query result, an appropriate indication is determined regarding whether a new learning attempt will be started, or whether the hydraulics are to be replaced.

Using the support points determined with the two above-described approaches or using distinctive working points of the hydraulic pump, either a characteristic curve is directly determinable or a default characteristic curve is adaptable without a sensor system on the component test bench, and is utilized for the further operation of the transmission 3, in order to be able to operate the transmission 3 to the desired extent. If a default characteristic curve is adapted with the aid of the support points, a basic progression of the pump characteristic curve between the range I and the range II, which may not be robustly determinable with the aid of the above-described approaches, is predefined to a sufficient extent, which is not readily possible in a fundamental new determination of the pump characteristic curve.

In order to also be able to learn or determine ranges of the pump characteristic curve above the range II with the aid of the second or the further approach, in one variant of the further approach, the consumption of the transmission actuation or of the actuator system of the transmission 3, in addition to the leakage of the hydraulic system, is initially adjusted in a defined manner. Thereafter, in turn, the displacement of the hydraulic pump is reduced for as long as it takes to detect a defined system pressure drop, wherein the volumetric output flow currently made available by the hydraulic pump in this case is equal to the sum of the leakage oil flow of the hydraulic system and the volumetric output flow utilized for the transmission actuation. Due to the defined setting of the transmission actuation, greater flows flow out of the hydraulic system during the actuation phase of the transmission 3 than is the case due solely to the leakages of the hydraulic system, whereby support points of the pump characteristic curve corresponding to higher volumetric output flows are also learned.

While the current ramp of the actuating pressure i_EDS of the electro-hydraulic pressure regulator associated with the hydraulic pump is followed in the direction of lesser volumetric output flows of the hydraulic pump, it is also possible to carry out a charging of the clutch of the dual clutch system with a defined pressure delta at every current step. This defined pressure delta corresponds to a defined flow in the direction of the piston chamber of the clutch. Provided the system pressure remains nearly unchanged during the charging of the clutch, the volumetric output flow of the hydraulic pump is greater than the total flow flowing out of the hydraulic system, i.e., the volumetric output flow of the hydraulic pump is greater than the sum of the leakage oil flow of the hydraulic system and the hydraulic fluid flow flowing out during the charging of the clutch. When a defined system pressure drop occurs, it is detected that the present current value i_EDS of the electro-hydraulic pressure regulator associated with the hydraulic pump corresponds to the outflowing or withdrawn volumetric output flow or is greater than or less than the outflowing or withdrawn volumetric output flow by the difference between the current steps, at most, depending on the direction in which the current ramp is followed.

In order to compensate for hysteresis effects once again, a current ramp is subsequently followed in the direction of higher flows. The support point of the pump characteristic curve to be learned has been reached as soon as a defined system pressure drop is no longer detected.

Further flow support points are learned to the above-described extent merely by varying the pressure delta for charging the clutch and, therefore, also varying the flow in the direction of the piston chamber of the clutch.

In an additional approach for learning at least one range of the pump characteristic curve according to FIG. 2, starting from a defined operating condition until a defined operating condition change of the hydraulic consumer has been reached, a hydraulic consumer of the hydraulic system, which is, for example, a gear shift cylinder, is essentially acted upon by the total flow currently made available by the hydraulic pump and, in addition, the time period required for the defined operating condition change is determined.

A shift rail piston of the gear shift cylinder has a defined volume and a defined surface area. The total flow made available by the hydraulic pump can be determined by measuring the time which passes during the displacement of the shift rail from a defined position, for example, the end position of a gear of the dual clutch transmission, in the direction of the end position of the opposite gear. Since the transmission 3 is equipped with an appropriate displacement sensor system in the area of the gear shift cylinder, any operating condition changes of the gear shift cylinder, for example, even travel along subsections of the total movement travel of a shift rail, can be analyzed for the determination of the volumetric output flow of the hydraulic pump.

In order to be able to determine various support points of the pump characteristic curve using the additional approach, the electro-hydraulic pressure regulator associated with the hydraulic pump is acted upon with current steps to be learned in different ways and, in each case, the transmission actuator system is actuated and hydraulic fluid is applied to the hydraulic consumer to the above-described extent. The flow of the variable displacement hydraulic pump calculated on the basis of the operating condition change of the hydraulic consumer is corrected by the total leakage oil flow of the hydraulic system, wherein the flow calculated in this way corresponds to the actual volumetric output flow of the variable displacement hydraulic pump.

Alternatively, it is possible to determine the volumetric output flow made available by the hydraulic pump, in this case, via the defined charging of a clutch of the dual clutch system with a defined pressure delta, since the defined pressure delta corresponds to a defined flow routed in the direction of the piston chamber of the clutch.

The particular blending of the transmission actuator system and the clutch actuator system selected with respect to regulating technique defines the range of the pump characteristic curve which can be learned with the aid of the additional approach.

Modifications and variations can be made to the embodiments illustrated or described herein without departing from the scope and spirit of the invention as set forth in the appended claims.

REFERENCE CHARACTERS 1 vehicle drive train
2 drive machine
3 transmission
4 driven end
i_EDS actuating current
i_EDS1 to i_EDS8 discrete current value of the actuating current
Vp volumetric output flow of the variable displacement hydraulic pump
Vp1 to Vp8 discrete value of the volumetric output flow

The invention claimed is:

1. A method for actuating a hydraulic system of a transmission (3) that comprises a variable displacement hydraulic pump and a pilot-controllable system pressure valve arranged on a pressure side of the hydraulic pump, a system pressure of a primary pressure circuit being adjustable by the system pressure valve depending on a volumetric output flow (Vp) of the variable displacement hydraulic pump and on pilot control of the system pressure valve, wherein in order to determine a pump characteristic curve of the hydraulic pump, the method comprises:

initially transferring the hydraulic system into a defined operating condition range in which the volumetric output flow (Vp), which is routed via the system pressure valve and is applied at the system pressure valve by the hydraulic pump, is greater than or less than a hydraulic fluid flow which is flowing out of the hydraulic system and has been adjusted in a defined manner;

pilot-controlling the system pressure valve to set a defined pressure level of the system pressure;

reducing or increasing the volumetric output flow (Vp) starting from the defined operating condition of the hydraulic system while monitoring the system pressure; and determining the volumetric output flow (Vp) corresponding to the hydraulic fluid flow of the hydraulic system at the point in time at which a deviation of the monitored system pressure from the defined system pressure is greater than or equal to a first threshold or is less than or equal to a second threshold.

2. The method of claim 1, further comprising:

transferring the hydraulic system back into the defined operating condition range after determining the volumetric output flow (Vp) corresponding to the hydraulic fluid flow;

changing the hydraulic fluid flow with respect to the preceding determined volumetric output flow (Vp) of the hydraulic pump, and thereafter, reducing or increasing the volumetric output flow (Vp) of the hydraulic pump; and re-determining the volumetric output flow (Vp) of the hydraulic pump corresponding to the hydraulic fluid flow of the hydraulic system at the point in time at which there is a deviation of the current monitored system pressure from the defined system pressure equal to a threshold.

3. The method of claim 2, wherein the hydraulic fluid flow of the hydraulic system is changed in steps.

4. The method of claim 2, wherein the volumetric output flow (Vp) of the hydraulic pump is set at a defined level to implement the defined operating condition of the hydraulic system.

5. The method of claim 4, wherein the defined level of the volumetric output flow (Vp) of the hydraulic pump is set as a function of the hydraulic fluid flow.

6. The method of claim 2, wherein the hydraulic fluid flow is varied depending on an actuation of one or multiple electro-hydraulic pressure regulators of the hydraulic system.

7. The method of claim 1, wherein:

the system pressure is measured by a sensor arranged proximate an actuator to which the system pressure is applied; and a value is predefined for a pressure level of an actuating pressure to be applied in the area of the actuator, and the value is greater than the currently set system pressure.

8. The method of claim 1, wherein an actuating pressure to be applied at a clutch of the transmission is set to a value greater than the system pressure with the aid of an electro-hydraulic pressure regulator associated with the clutch.

9. The method of claim 1, wherein the hydraulic fluid flow is determined using a model depicting the hydraulic system.

10. The method of claim 1, wherein the volumetric output flow (Vp) of the hydraulic pump is varied depending on a pilot pressure which is predefined in the area of an electro-hydraulic pressure regulator, and the pilot pressure depends on an actuating current which is applied at the pressure regulator.

11. The method of claim 10, further comprising determining the characteristic curve, which shows the dependence of the volumetric output flow (Vp) of the hydraulic pump on the actuating current which is applied in the area of the electro-hydraulic pressure regulator associated with the hydraulic pump, depending on the hydraulic fluid flow.

12. The method of claim 11, wherein the characteristic curve is determined from defined support points, and the support points of the characteristic curve correspond to current values (i_EDS5 to i_EDS8) of the actuating current (i_EDS) of the electro-hydraulic pressure regulator associated with the hydraulic pump.

13. The method of claim 12, wherein the defined support points (i_EDS5 to i_EDS8) of the characteristic curve are determined by a ramp-like raising and a subsequent ramp-like reduction of the actuating current (i_EDS) of the electro-hydraulic pressure regulator associated with the hydraulic pump, and each current value (i_EDS5 to i_EDS8) corresponding to a respective one of the support points corresponds to the mean value of the current values which are determined during the ramp-like raising and the ramp-like reduction of the actuating current for the respective one of the support points.

14. The method of claim 10, further comprising adapting a default characteristic curve, which shows the dependence of the volumetric output flow (Vp) of the hydraulic pump on the actuating current which is applied in the area of the electro-hydraulic pressure regulator associated with the hydraulic pump, depending on the hydraulic fluid flow.

15. The method of claim 14, wherein the default characteristic curve is determined from defined support points, and the support points of the default characteristic curve correspond to current values (i_EDS5 to i_EDS8) of the actuating current (i_EDS) of the electro-hydraulic pressure regulator associated with the hydraulic pump.

16. The method of claim 15, wherein the defined support points (i_EDS5 to i_EDS8) of the default characteristic curve are determined by a ramp-like raising and a subsequent ramp-like reduction of the actuating current (i_EDS) of the electro-hydraulic pressure regulator associated with the hydraulic pump, and each current value (i_EDS5 to i_EDS8) corresponding to a respective one of the support points corresponds to the mean value of the current values which are determined during the ramp-like raising and the ramp-like reduction of the actuating current for the respective one of the support points.

17. The method of claim 16, wherein the current values (i_EDS5 to i_EDS8) determined for the support points are validated with predefined values.

* * * * *